United States Patent [19]

Iwai et al.

[11] Patent Number: 5,060,748
[45] Date of Patent: Oct. 29, 1991

[54] SADDLE TYPE VEHICLE HAVING A STORAGE RECEPTACLE

[75] Inventors: Kazuhiro Iwai, Saitama; Shinji Matsubayashi, Tokyo; Ikuo Ariga, Saitama, all of Japan; Kazuhiko Saito, Rancho Palos Verdes, Calif.

[73] Assignee: Honda Giken Kogyo Kabushiki Kaisha, Tokyo, Japan

[21] Appl. No.: 336,710

[22] Filed: Apr. 12, 1989

[51] Int. Cl.⁵ .............................................. B62D 61/08
[52] U.S. Cl. .................................... 180/215; 296/37.1
[58] Field of Search ............... 180/215, 219, 210, 211, 180/252; 296/37.16, 37.1

[56] References Cited

U.S. PATENT DOCUMENTS

| | | | |
|---|---|---|---|
| 2,504,452 | 4/1950 | Rostan | 180/219 |
| 4,091,887 | 5/1978 | Kurata et al. | 180/219 |
| 4,325,562 | 4/1982 | Yamada et al. | 280/62 |
| 4,449,602 | 5/1984 | Dittman, Jr. | 180/215 |
| 4,577,719 | 3/1986 | Nomura et al. | 180/219 |

FOREIGN PATENT DOCUMENTS 59-128016  7/1984  Japan .

*Primary Examiner*—Andres Kashnikow
*Assistant Examiner*—Richard Camby
*Attorney, Agent, or Firm*—Irving M. Weiner; Joseph P. Carrier; Pamela S. Burt

[57] ABSTRACT

A saddle type, off-road vehicle, comprising a frame, an engine supported on the frame, at least one front wheel, a pair of rear wheels disposed on opposite sides of the frame, and a storage receptacle having at least a portion thereof positioned above the rear frame. The storage receptacle having at least a portion thereof positioned rearwardly of the seat and the storage receptacle having an opening defined in an upper surface thereof, including a lid means for opening and closing the upper surface of the storage receptacle.

23 Claims, 10 Drawing Sheets

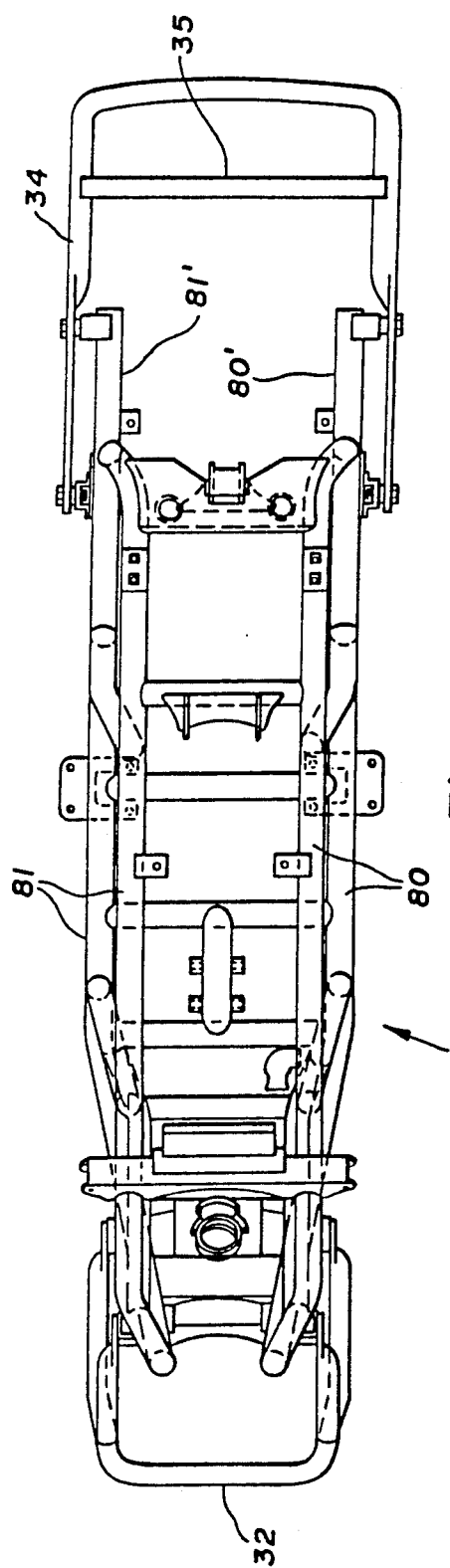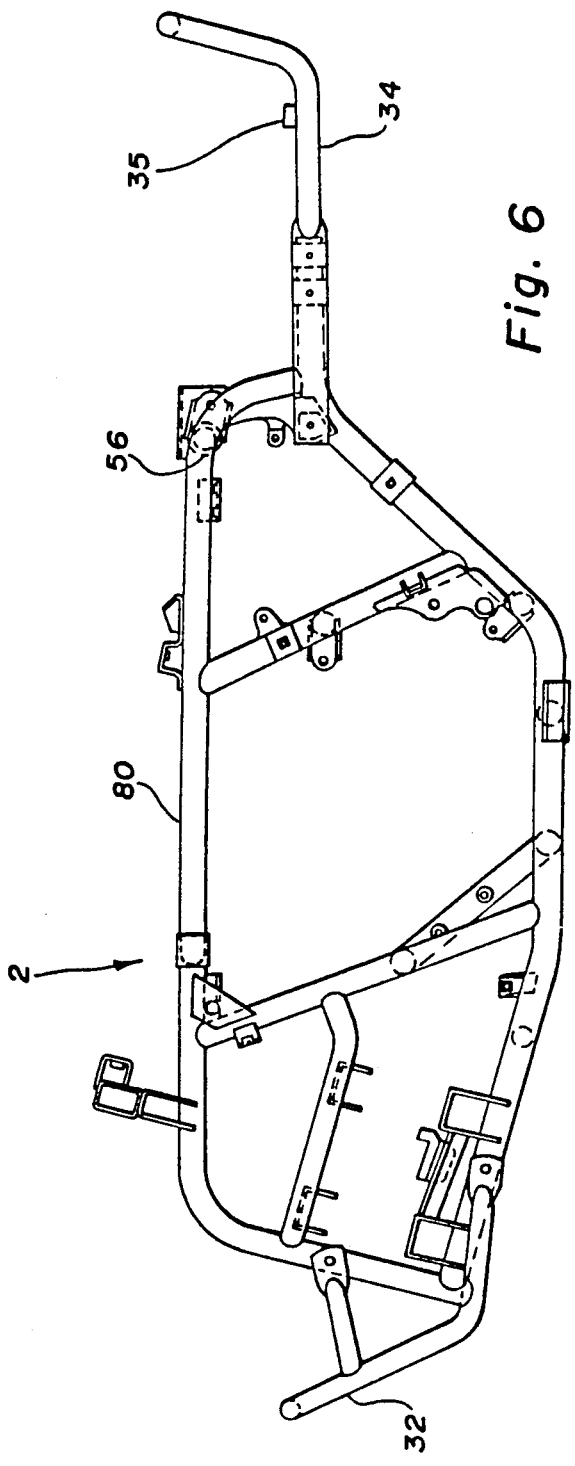

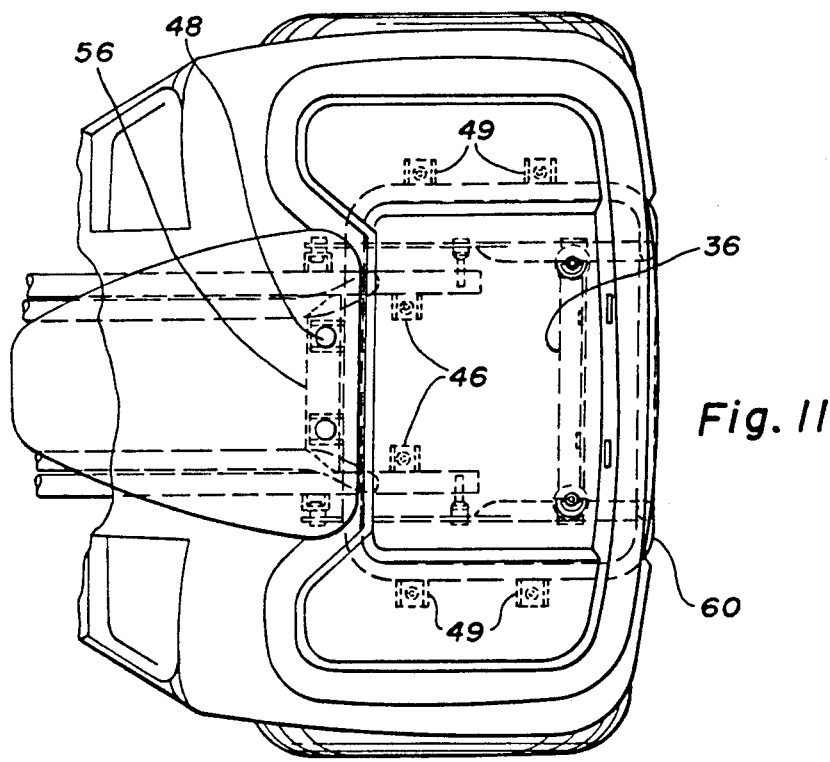
Fig. 11
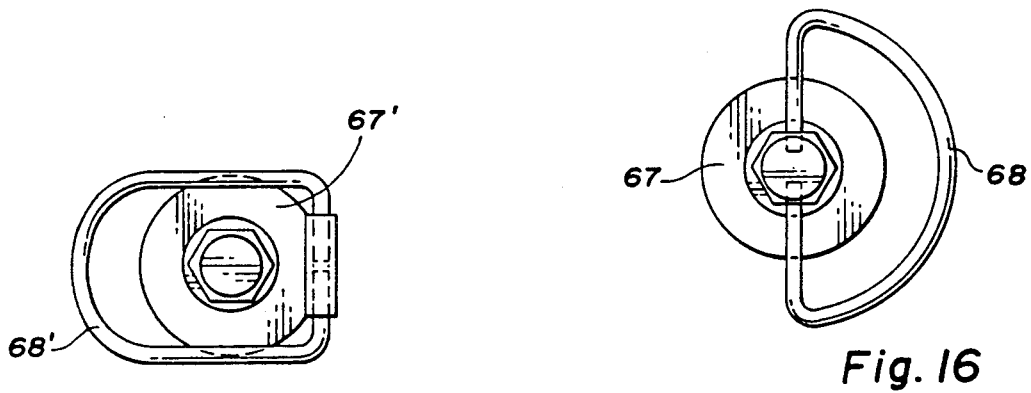
Fig. 18
Fig. 16
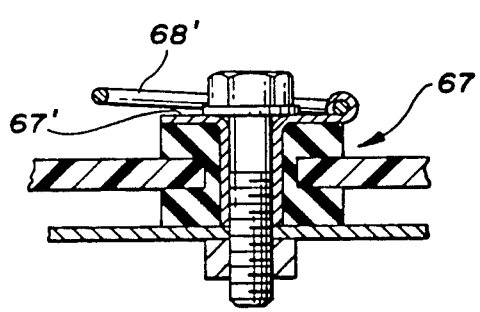
Fig. 17
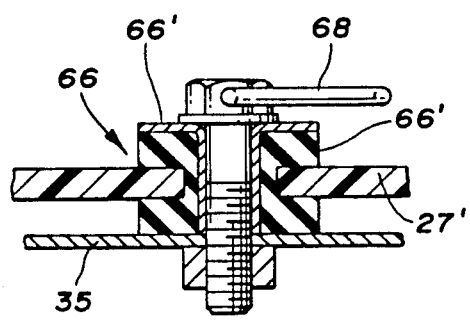
Fig. 15

SADDLE TYPE VEHICLE HAVING A STORAGE RECEPTACLE

BACKGROUND OF THE INVENTION

1. Field of the Invention

The present invention relates to a saddle type, off-road vehicle having a relatively large storage receptacle provided thereon. More particularly, the present invention relates to a saddle type, off-road vehicle having a saddle type seat similar to a motorcycle, a pair of rear wheels and a pair of front wheels each provided with balloon type low pressure tires and supported by a vehicle frame, a relatively large storage receptacle provided at a rear portion of the vehicle, and a cover and/or load securing means associated with the storage receptacle.

2. Description of the Relevant Art

There are many known saddle type, off-road vehicles, including many three and four wheeled vehicles. These known vehicles are normally equipped with balloon type, low pressure tires for traveling through and over many different terrains. Further, these known vehicles have been primarily used for, and associated with, recreational purposes. It has been recognized, however, that these vehicles can be used for purposes other than recreation, such as for use in farm activities, ranch activities, forest activities, etc., because of their great ability to travel over many different terrains.

It is difficult to conveniently carry or transport large loads other than the rider, such as tools, camping equipment, etc., with most of the known saddle type, off-road vehicles because these vehicles are not provided with any covered or partially covered storage space.

In slight contrast to the general complete absence of storage space, two known saddle type, three-wheeled vehicles are disclosed in U.S. Pat. No. 4,325,562 and Japanese Patent Publication No. 59-128016, respectively, each of which includes a container positioned rearwardly of a rider's seat for containing loads, such as items of clothing, a lunch, small pieces of luggage, etc. The container disclosed in U.S. Pat. No. 4,325,562 is rather small and, correspondingly, is capable of containing only small objects. The container disclosed in Japanese Patent Publication No. 59-128016 is larger than that disclosed in the U.S. Patent, but to achieve this increased size the receptacle is positioned very closely above the vehicle's rear axle, as shown in FIG. 4 of the Publication. Such close positioning is undesirable because the container would tend to interfere with vertical bouncing movements of the rear axle if the container were supported separately from the axle, and because the container would be subjected to excessive bouncing and vibrations if it were supported together with the rear axle. Note, the Japanese Publication does not disclose how the container is actually supported on the vehicle, or how the container would cooperate with the rear axle.

Although these two known vehicles with containers are an improvement over the majority of known saddle type, off-road vehicles which have no covered storage space, they are still unsuitable for conveniently transporting relatively large and/or heavy loads, which would be desirable in many situations.

The present invention has been developed to overcome the above-discussed problems and disadvantages of known saddled type, off-road vehicles.

SUMMARY OF THE INVENTION

It is an object of the present invention to provide a saddle type, off-road vehicle having a relatively large storage receptacle provided at a rear portion thereof, which storage receptacle has a relatively large opening defined in an upper surface thereof for permitting large loads to be conveniently placed into and removed from the storage receptacle.

It is another object of the present invention to provide such a saddle type vehicle which further includes a detachable lid which can be readily secured over the upper opening in the storage receptacle.

It is a similar object of the present invention to provide such a saddle type vehicle which includes a load securing means situated near the storage receptacle for securing objects placed in the storage receptacle.

It is still another object of the present invention to provide such a saddled type vehicle in which the storage receptacle is structurally rigid and strong so that it can be effectively used for storing and transporting large, heavy objects, and for other demanding, work-related activities.

According to the present invention, a saddle type, off-road vehicle is provided which comprises a frame, an engine supported by the frame, at least one front wheel, a pair of rear wheels disposed on opposite sides of the frame, and a storage receptacle having at least a portion thereof positioned above the frame. The storage receptacle has an opening defined in an upper surface thereof.

Further, a vehicle according to the present invention may include a detachable lid which is selectively securable over the opening defined in the storage receptacle and/or a load securing means provided in the vicinity of the storage receptacle for securing objects placed in the storage receptacle. Additionally, the vehicle according to the present invention may include a rigidity compensation means provided in surrounding relation to the opening formed in the storage receptacle for increasing the strength and rigidity of the storage receptacle.

The above and other objects, features and advantages of the present invention will become apparent from the following description when taken in conjunction with the accompanying drawings which illustrate preferred embodiments by way of example.

BRIEF DESCRIPTION OF THE DRAWINGS

FIG. 5 is a plan view of a frame of the vehicle shown in FIG. 1.

FIG. 6 is a side view of the frame of the vehicle shown in FIG. 1.

FIG. 7 is a plan view of an integral rear fender and storage receptacle unit of the vehicle shown in FIGS. 1-4.

FIG. 11 is a plan view of a rear section of the vehicle in FIG. 1 which particularly shows the connections between the storage receptacle and the vehicle's frame.

FIG. 15 is an enlarged side sectional view of a connection between the storage receptacle and the frame, while FIG. 16 is a plan view of FIG. 15.

FIGS. 17 and 18 show a modification of the connection shown in FIGS. 16-17.

DETAILED DESCRIPTION OF THE PREFERRED EMBODIMENTS

Figure 1:
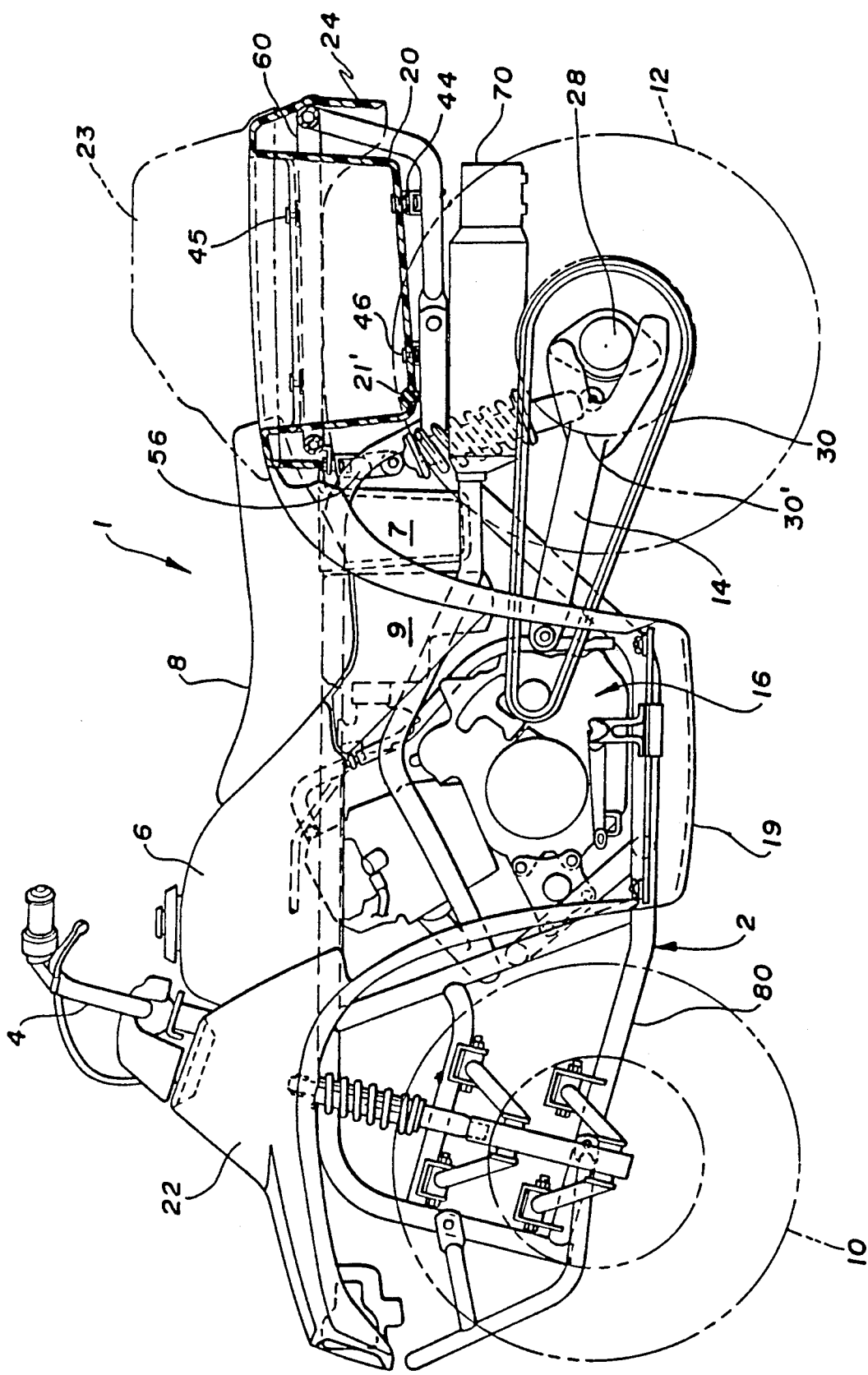
FIG. 1 is a side view of a saddle type, off-road vehicle according to a first embodiment of the present invention.

Referring to FIGS. 1-4, there is shown a saddle type, off-road vehicle 1 according to a first embodiment of the present invention. The vehicle includes a frame 2 (shown more particularly in FIGS. 5 and 6) which supports a steering handle 4, a fuel tank 6, a rider's seat 8, a pair of front wheels 10 (each with a balloon type, low pressure tire) which are steered through the steering handle 4, a rear swing arm assembly 14, a drive unit 16 including an internal combustion engine and a transmission means for transferring rotative power to a pair of rear wheels 12 (each of which is also provided with a balloon type, low pressure tire), a pair of foot supports 18 provided on opposite sides of the frame, a battery 7, an air cleaner 9, a front fender 22 covering the front wheels 10, a rear fender 24 covering the rear wheels 12 and a storage receptacle 20 disposed rearwardly of the rider's seat 8.

Figure 4:
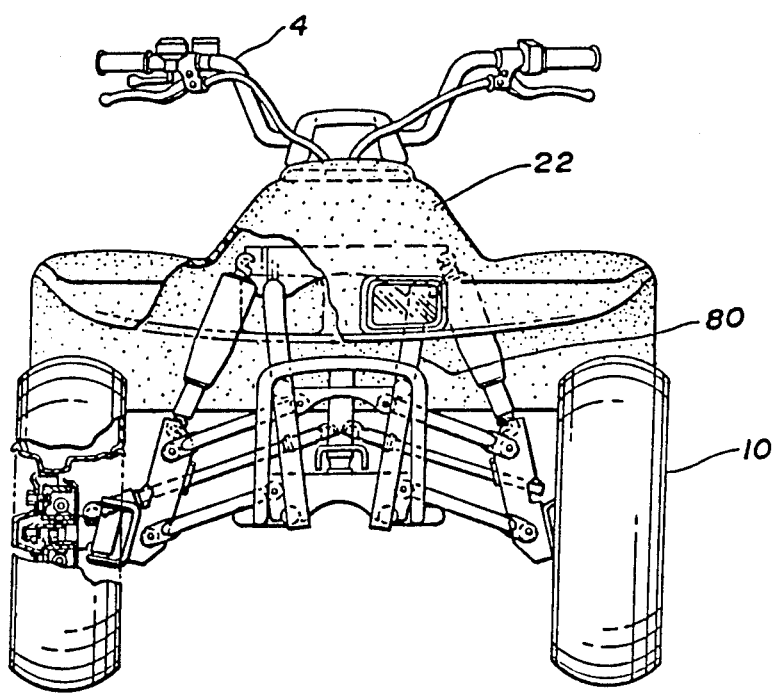
FIG. 4 is a front view, partly in section, of the vehicle shown in FIG. 1.

As shown in FIGS. 1 and 4, each of the front wheels 10 is independently supported on a front end of the frame 2 by a double wishbone type suspension, while a pair of headlights may be provided at a front end of the front fender 22.

Note that, the rear swing arm assembly 14 vertically swingably supports the rear axle 28, which in turn supports the rear wheels 12 in this embodiment. As shown in FIG. 1, the rear axle 28 is supported on a rear end of the rear swing arm assembly 14 so that it can be readily adjusted in the longitudinal direction of the vehicle, and is rotatably driven by the transmission means of the drive unit 16 which is depicted as including a drive chain 30 provided around a sprocket 30' fixed to the rear axle 28. It will be understood that although a sprocket and chain type transmission means is disclosed in FIGS. 1-4, other known types of transmission means, such as drive shaft type, could be used in vehicles according to the present invention. Further, the vehicle could include front driven wheels as well as (or as an alternative to) rear driven wheels.

Referring to FIGS. 1 and 3-6, there is shown a frame 2 including a pair of longitudinally extending, laterally spaced sections 80, 81 and a plurality of cross members which connect and reinforce the sections 80, 81. As best shown in FIGS. 1 and 6, the major part of each section 80, 81 is generally loop shaped when viewed from the side. Such a loop shape is preferred because it provides improved strength and rigidity. As also depicted, each of sections 80, 81 preferably includes a smaller rear part 80', 81', respectively, which extends integrally rearwardly from a lower portion of the major, loop shaped part, and which functions to support the storage receptacle 20.

Although the depicted construction of the frame 2 is preferred, it will be understood that a vehicle according to the present invention could include differently constructed frames. For example, the sections 80, 81 may not include rear projecting parts such as 80', 81', whereby the storage receptacle could be supported by upper or rear surfaces of the loop shaped parts. Further, the laterally spaced sections of the frame may not be loop shaped, but rather may be simply constructed as longitudinally extending members formed from cast aluminum or the like.

The vehicle 1 also preferably includes a front guard 32 extending forwardly and upwardly from a front, lower portion of the frame 2, and a rear guard 34 extending rearwardly and upwardly from the rear parts 80', 81' of the frame 2. As shown, a rear end of the rear guard 34 preferably extends upwardly and slightly rearwardly of a lower rear end of the storage receptacle 20, and the rear guard may include one or more cross members 35 connected laterally across intermediate portions thereof to provide added strength and rigidity. The front and rear guards 32, 34 may be connected to the frame 2 using appropriate fastening means, as shown, or may be formed integrally with the frame through welding or the like.

Additionally, the vehicle may include a subframe 60 (see FIGS. 1, 3 and 11) which would provide additional support for the storage receptacle 20. As depicted, the subframe 60 is preferably a rectangularly shaped ring which includes the rear laterally extending member of the rear guard 34, while a front end of the subframe is supported on a laterally extending cross member 56 of the frame 2 at connections 48. Lateral side portions of the subframe 60 are positioned beneath a stepwise structure between central and laterally extending portions 27, 29 of the storage receptacle 20 discussed further below.

As shown in FIGS. 1-3 and 7-9, the rear fender 24 and the storage receptacle 20 are preferably constructed or formed as an integral unit. Such integral unit is preferably composed of synthetic materials such as moldable plastics, fiberglass, etc., but may be constructed of other conventional materials such as sheet metal. The integrally constructed rear fender and storage receptacle unit is advantageous for many reasons including relatively low manufacturing costs, increased structural rigidity, attractive appearance, etc.

Figure 2:
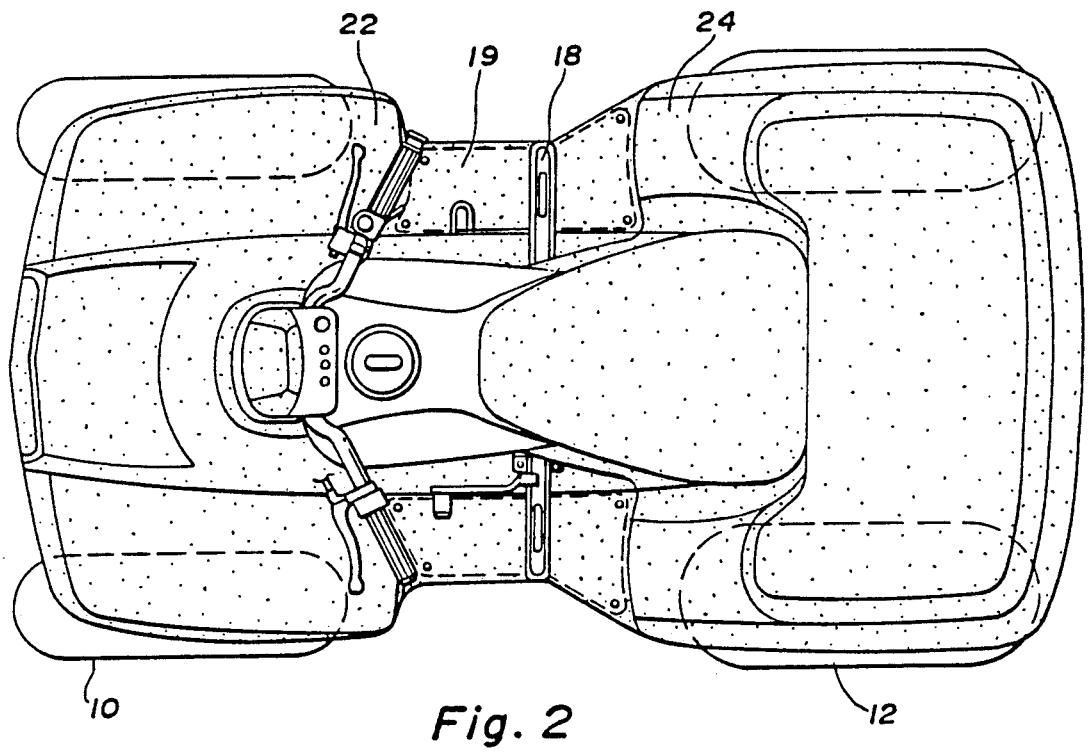
FIG. 2 is a plan view of the vehicle shown in FIG. 1.

The storage receptacle 20 is preferably completely open at an upper end thereof, or in other words the storage receptacle has a large opening 21 defined in an upper surface thereof. As shown in FIG. 2, the opening 21 is substantially wider than the rider's seat 8, while the front portion of the opening is substantially U-shaped as viewed in plan and is located at lateral sides of a rear part of the seat. As depicted, the storage receptacle 20 preferably includes a central, lower portion 27 and an upper, laterally extending portion 29 which extends laterally of the central portion 27 on both sides thereof such that there is a stepwise structure defined between the central and laterally extending portions. Similarly, there is a stepped structure between the laterally extending portion 29 of the storage receptacle 20 and the rear fender 24. The stepwise structure between the central and laterally extending portions 27, 29 may be sloped such as shown by the ghost lines in FIG. 9. A removable partition plate 27' (see FIG. 3) may be provided in the storage receptacle to separate or isolate portions 27, 29 from each other when desired. The partition 27' is preferably a simple flat plate that rests on the upper portion 29.

Figure 8:
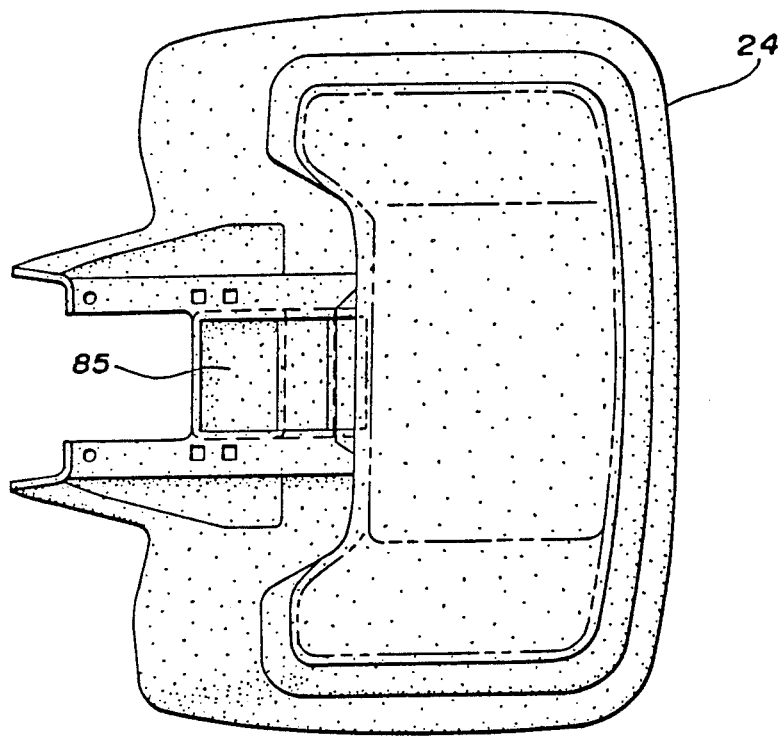
FIG. 8 is a side view and FIG. 9 is a rear view, respectively, of the integral rear fender and storage receptacle unit shown in FIG. 7 with portions of the unit broken away to show additional structural details thereof.
Figure 9:
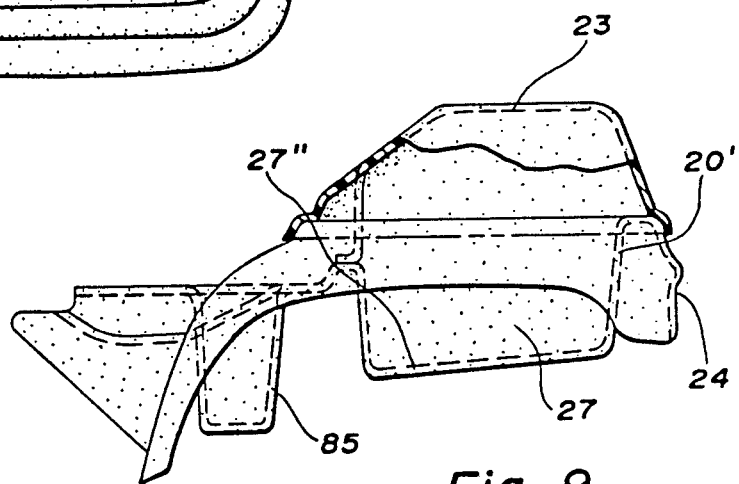
Figure 10:
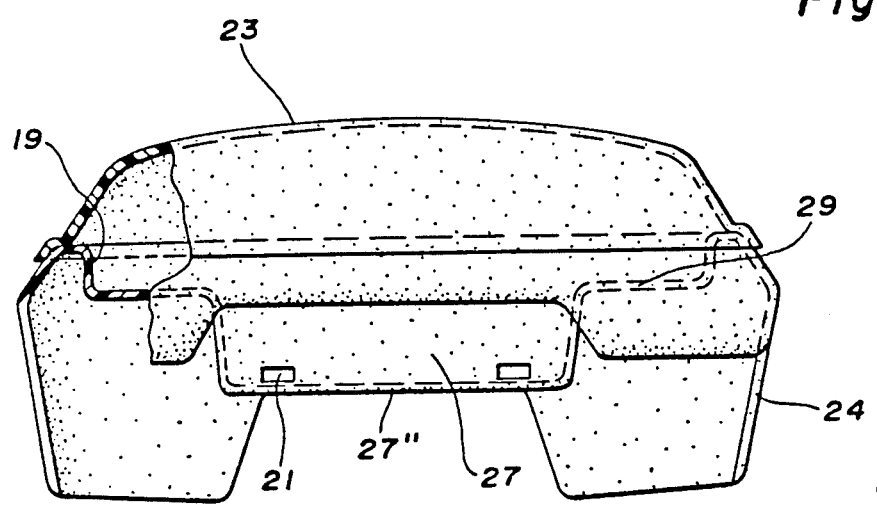
FIGS. 10(a) and 10(b) are partial sectional rear views of modification to the integral rear fender and storage receptacle unit shown in FIG. 9.
Figure 10B:
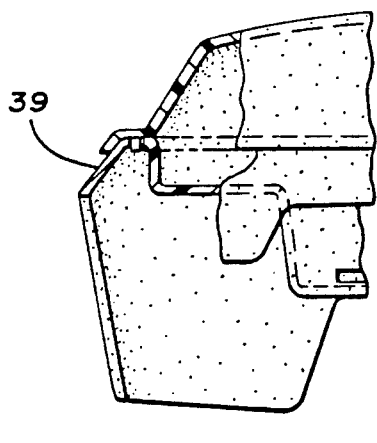
Figure 10A:
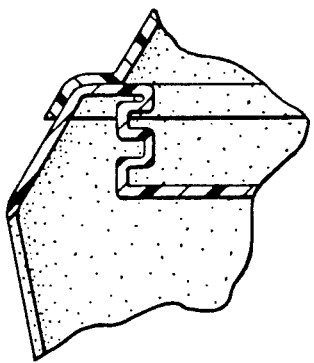

The large opening 21 defined in the upper surface of the storage receptacle 20 desirably permits objects to be easily placed into and taken out of the storage receptacle. To ensure that the storage receptacle 20 is sufficiently strong and rigid, a rigidity compensation means is provided around the opening 21 defined in the upper surface thereof. Particularly, and as best shown in FIGS. 8 and 9, the rear fender 24 preferably extends outwardly and downwardly around the full perimeter of the upper end of the storage receptacle to ensure that the upper end of the storage receptacle is sufficiently strong and rigid. Additionally, a rigidity compensation means for the storage receptacle 20 may include one or more ribs formed near an upper edge of the storage receptacle, as shown in FIG. 10(a), or the upper portion of the storage receptacle 20 may be formed with an increased thickness.

The vehicle includes a lid means 23 which can be readily secured over the open upper end of the storage receptacle 20 to provide a relatively large enclosed receptacle for storing objects.

As also shown in FIGS. 1-3 and 7-9, the lid means 23 has a lower peripheral lip 25 which extends slightly outwardly and downwardly of the upper edge of the storage receptacle 20. In this manner, the lid means 23 can be easily placed over the storage receptacle 20 to enclose its open upper end, and can be just as easily removed when desired. In the depicted embodiment, the lid means 23 will remain securely in place over the storage receptacle 20 when simply placed thereon, i.e., without the use of a securing means, and cooperates with the rear fender 24 to provide a sleek appearance. A modification to the storage receptacle 20 and the lid means 23 is shown in FIG. 10(b). Particularly, a groove may be formed in the upper surface of the storage receptacle (or in the upper surface of the junction between the storage receptacle and the rear fender) and a downwardly projecting ring 39 may be formed on the lower peripheral lip 25 of the lid means 23, which projecting ring 39 would be fitted in the groove when the lid means 23 is placed over the storage receptacle 20 to additionally secure the lid means in place over the storage receptacle. As an alternative, a plurality of downward projections could be provided in a spaced manner around the lower peripheral lip 25 of the lid means 23, and the upper surface of the storage receptacle could have a plurality of corresponding recesses formed therein for receiving the projections when the lid means is placed over the storage receptacle.

Although not shown, the lid means 23 could be pivotally atttached to the storage receptacle 20 through an appropriate hinge or hinges, which would permit the lid means 23 to pivot open in a rearward direction, a forward direction or a sideward direction. Additionally, a latch mechanism could be provided between the lid means 23 and the storage receptacle 20 (or the rear fender 24) to better secure the lid means in a closed position, and a lock could be provided for the latch mechanism.

Figure 20:
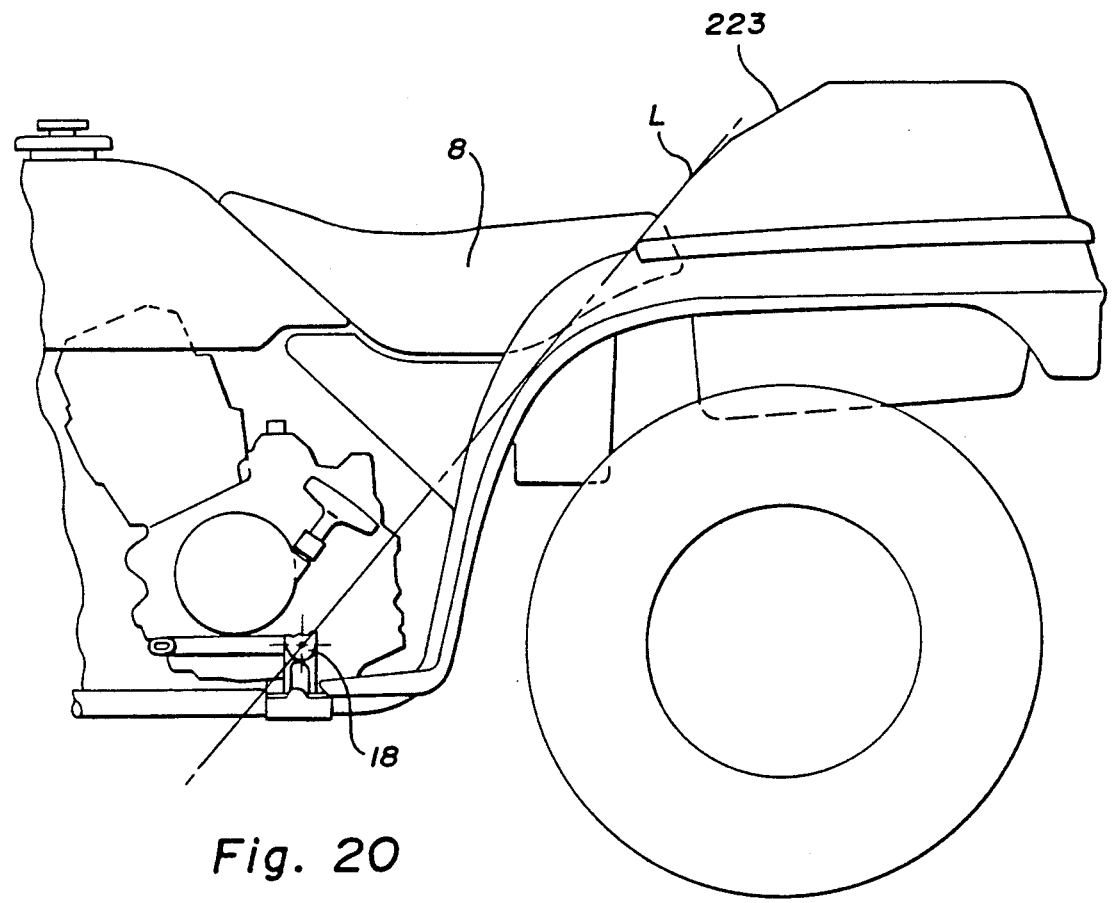
FIG. 20 is a side view of a slight modification to the vehicle in FIG. 1.

As shown in FIG. 20, a front sloping surface of a slightly modified lid means 223 is preferably disposed rearwardly of a line L, extended through the foot support 18 and an upper rear portion of the seat 8.

Figure 12:
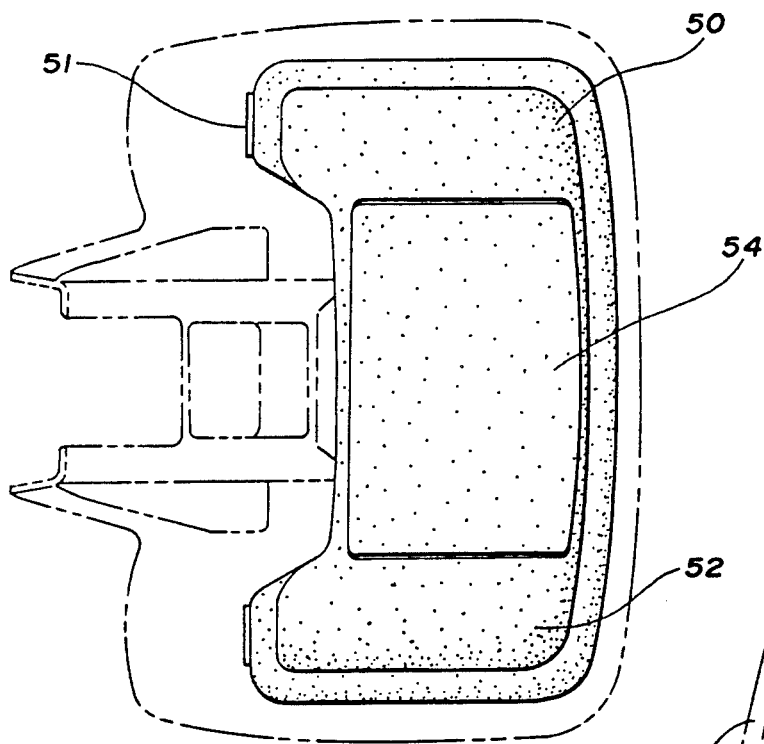
FIG. 12 is a plan view of an integral rear fender and storage receptacle unit similar to FIG. 7 but including a modified lid for the storage receptacle.
Figure 13:
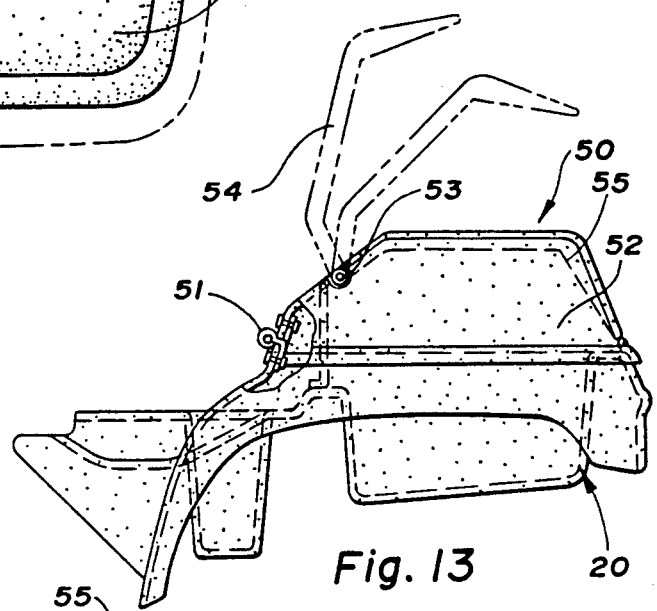
FIGS. 13 and 14 are a side view and a rear view, respectively, of the integral unit shown in FIG. 12.
Figure 14:
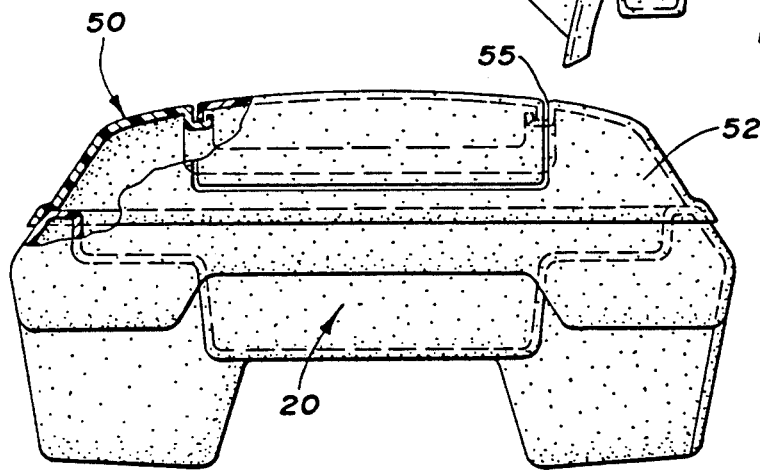

Referring to FIGS. 12-14, there is shown an integral storage receptacle and rear fender unit which is substantially similar to that shown in FIGS. 7-9, but which has a modified lid means 50 provided thereon. The modified lid means 50 includes a first lid 52 which cooperates with the storage receptacle 20 in substantially the same manner as the lid means 23 shown in FIGS. 1-3 and 7-9. Note that hinges 51 are provided at front ends of a front U-shaped portion of the first lid 52 which permit the first lid to pivot forwardly. The hinges 51 are preferably of a type which also permit the first lid 52 to be easily completely detached from the storage receptacle when desired. The modified lid means 50 also includes a second smaller lid 54 which is provided over an opening 55 defined in a central, upper portion of the first lid 52. The second lid 54 is pivotally connected to the first lid 52 at hinge 53 such that the second lid 54 can pivot forwardly. The second, smaller lid 54 conveniently permits smaller objects to be readily placed into or taken out of the storage receptacle 20 at times when it may be inconvenient or undesirable to open or remove the larger first lid 52. If desired, the first lid 52 and/or the second lid 54 may be constructed to pivot rearwardly or sidewardly, rather than in the forward direction as shown. Also latch mechanisms and locks may be provide for the first lid 52 and the second lid 54 if desired.

As best depicted in FIG. 1, the storage receptacle 20 is preferably located above the rear axle 28. Such location favorably increases the rigidity of the storage receptacle 20 as disposed on the vehicle. The bottom surface of the storage receptacle 20 is preferably inclined forwardly and has at least one drain hole formed in a forward end thereof. The forward inclination of the bottom surface of the storage receptacle 20 permits the receptacle to be disposed at a relatively low position without interfering with the vertical swinging movements of the rear axle 28, and also helps to prevent objects stored in the storage receptacle from moving around. The angle of inclination may be substantially larger than that depicted in the drawings. The drain holes will preferably be provided with removable covers which would be used to prevent water and the like from entering the storage receptacle 20 through the drain holes during travel.

Preferably, the storage receptacle 20 will be positioned rearwardly of the major (loop shaped) part of the frame 2, and will be primarily supported by the rear parts 80',81' of the frame. The storage receptacle may be additionally supported by the rear guard 34 and the subframe 60, as depicted. As shown in FIGS. 1-3 and 19, the storage receptacle is connected for support to the rear parts 80', 81' of the frame 2 at connections 46, and to the cross member 35 of the rear guard 34 at connections 44. If the optional subframe 60 is utilized, the laterally extending portion 29 of the storage receptacle is secured to the subframe 60 at connections 49. An enlarged sectional view of one of the connections 44 is shown in FIG. 15. As shown in FIG. 15, a bottom wall 27" of the storage receptacle is secured to the cross member 34' of the rear guard 34 using a nut and bolt fastening means. A bushing 66, including a metal portion 66' and an elastic portion 66" is provided between the bottom wall 27" and the fastening means.

According to a preferred aspect of the present invention a load securing means will be provided in the vicinity of the storage receptacle 20 for securing objects placed within the storage receptacle. As shown in FIGS. 11, 15 and 16, the load securing means may simply comprise a hook member 68 connected to an upper end of the fastening means connecting the storage receptacle 20 to the rear guard 34. The hook members 68 are preferably pivotally connected to the fastening means so that they can be conveniently folded down when not in use and pivoted upwardly to an operative position when desired. Although the hook members 68 are depicted only in relation to connections 44 between the storage receptacle 20 and the rear guard 34, it will be understood that such hook members could also be provided in relation to connections 46 and 49. In use, the hook members 68 will be pivoted up to their operative positions and a rope, an elastic strap, a bungie cord, etc., will be used in cooperation with the hook members to secure objects within the storage receptacle 20.

FIGS. 17 and 18 present a slight modification to the load securing means shown in FIGS. 15 and 16. Particularly, in FIGS. 17-18 a hook member 68' is pivotally connected to the metal portion 67' of a bushing 67 between the storage receptacle and the fastening means.

Figure 19:
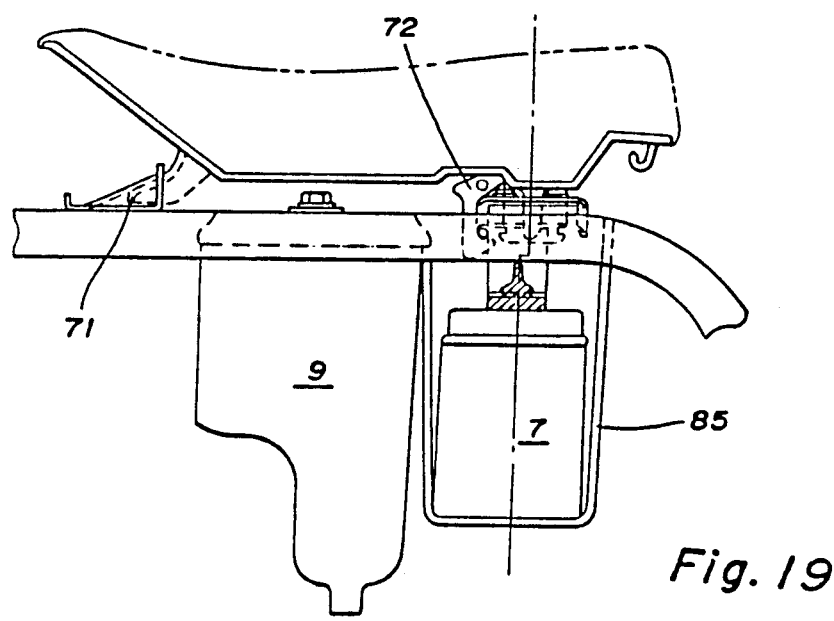
FIG. 19 is a side sectional view of an upper central portion of the vehicle including the seat.

Referring to FIG. 19, another load securing means 69 is depicted which can be used for securing objects in the storage receptacle 20. The securing means 69 preferably comprises a hook member which is formed integrally with the bottom plate 71 of the rider's seat 8, as depicted. Preferably a pair of the hook members will be connected to the bottom plate 71 of the seat 8 in a laterally spaced manner, to cooperate with one or more of the load securing means 68, 68' provided at connections 44, 46, 49. Although not shown, it is contemplated that the hook members of the load securing means 69 may be secured to a bottom plate 71 of the rider's seat 8 through an appropriate fastening means rather than being formed integrally therewith.

Figure 3:
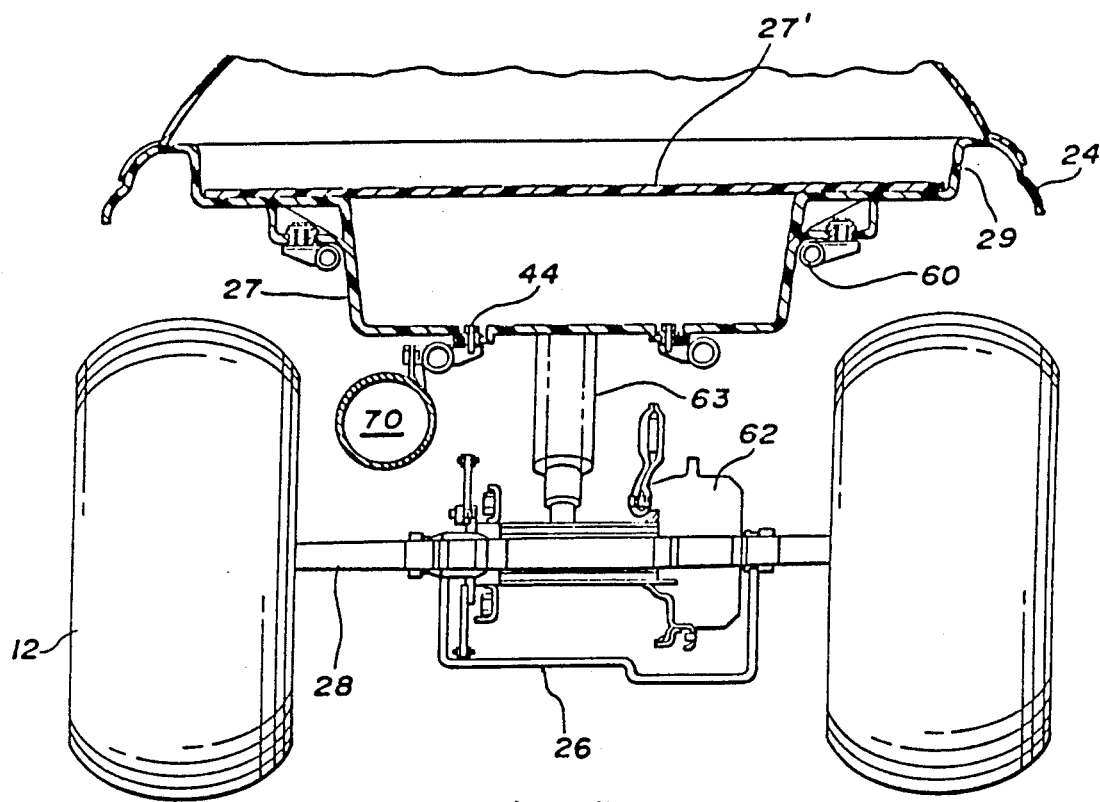
FIG. 3 is a rear view, partly in section, of the vehicle shown in FIG. 1.

Referring to FIGS. 1 and 3, cushioning unit 90 is interconnected between the vehicle's rear axle 28 and the frame cross member 56. More particularly, a lower end of the cushioning unit 90 is pivotally supported by a bracket extending upwardly from the rear axle, while an upper end of the unit 90 is connected to a bracket extending downwardly from the frame cross member 56.

The vehicle also includes a muffler 70 which, in the depicted embodiment, extends longitudinally of the vehicle at one side thereof. Preferably the muffler 70 will be disposed below the bottom wall 27" of the storage receptacle 20 but substantially above the rear axle 28 so that it will not interfere with swinging, vertical movements of the rear axle. Also in this regard, the muffler will be positioned in offset relation to driven means for the rear axle 28, such as the sprocket 30' driven by the drive chain 30, as well as to a braking mechanism 62 provided on the rear axle. Such offset relationship again ensures that the muffler 70 will not interfere with the driven means and the braking means 62 when the rear axle 28 is vertically moved, and also assures a better weight distribution or balancing of components at the rear end of the vehicle.

As shown in FIG. 3, a lower guard member 26 may be provided below the central part of the rear axle 28 for protecting the axle, the transmission means and the braking means 62 from engagement with the ground, rocks, or other foreign matter. The guard 26 would be secured to the swing arm assembly 14 or the frame 2 in an appropriate manner.

Referring to FIGS. 21-24, there is shown a saddled type, off-road vehicle 100 according to a second embodiment of the present invention. Many of the components of the vehicle according to the second embodiment are identical or substantially similar to the corresponding components in the first embodiment, and will not be discussed. Other components which are similar to those in the first embodiment will be referred to by a similar reference numeral having 100 added thereto.

The vehicle 100 according to the second embodiment of the present invention includes a frame 102 which supports a drive unit 116 including an internal combustion engine and a transmission means for driving both the front and rear wheels 110, 112, a cooling means 113 for the drive unit 116, a storage receptacle 120, a front carrier or rack 117, and a rear carrier or rack 160. As depicted, the transmission means of the drive unit 116 can include a pair of drive shafts which drive front and rear axles 126, 128 respectively. The rear axle 128 is vertically swingably supported by the main frame 102 through a swing arm assembly 114 which is pivotally connected to the main frame. Two known swing arm assemblies for supporting a shaft drive transmission means are disclosed in U.S. Pat. Nos. 4,646,865 and 4,749,205.

Figure 24:
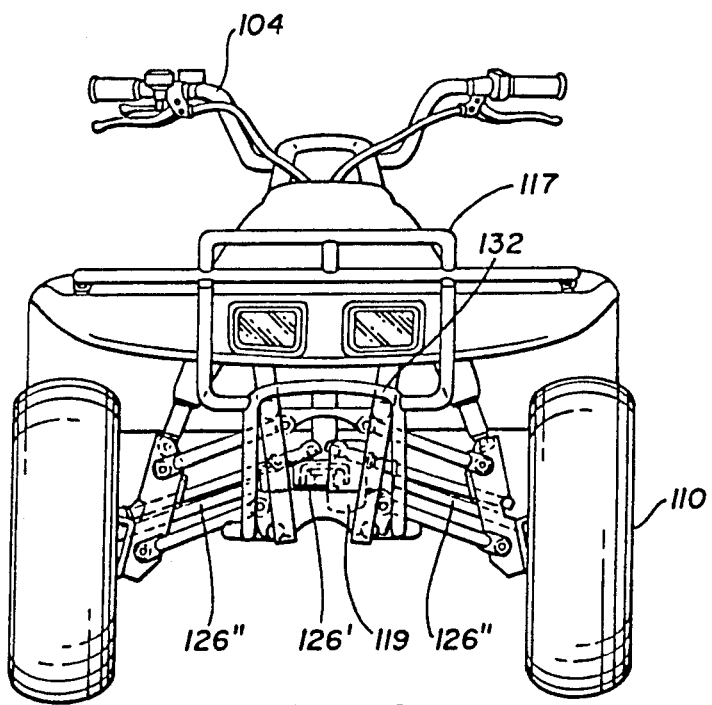
FIG. 24 is a front view of the vehicle shown in FIG. 14.

Referring to FIG. 24, the front axle 126 includes a central portion 126' which is non-pivotally supported on a front end of the main frame and a pair of sides sections 126", each of which is pivotally connected between the central sections 126' and one of the front wheels 110. The front axle 126 has a differential 119 associated therewith, the differential being operatively connected to a front driveshaft 115 of the transmission means of the drive unit 116. As depicted, each of the front wheels 110 is preferably, independently suspended from a front portion of the main frame 102 through a double wishbone suspension such as that used in the first embodiment of the present invention.

Similar to the frame 2 of the first embodiment, the frame 102 according to the second embodiment includes a pair of laterally spaced sections 180, 181, and a plurality of cross members connecting and reinforcing the sections; and the sections 180, 181 include major, loop shaped parts and small rear parts 180', 181'. The frame 102, however, differs from the frame 2 in several aspects. For example the frame 102 has a substantially different construction at a rear end thereof in comparison to the main frame of the frame 2. Particularly referring to FIG. 21, upper portions of the lateral side sections 180, 181 extend downwardly from a position near the steering handle 104 to a position near the rear end of the rear fender 124, and integrally include the rear parts 180', 181'. Also, a rear cross member 103 is preferably provided between a lower portion of the major part of each lateral section 180, 181 and the rear end of the corresponding rear part 180', 181' of the section.

The vehicle 100 also includes front and rear guards 132, 134 similar to the first embodiment, but the rear guard 134 is substantially shorter than the rear guard 34 of the first embodiment.

Additionally, the vehicle 100 includes the rear carrier rack 160, but does not include a subframe such as the subframe 60 of the first embodiment. The rack 160 is preferably connected to the rear guard 134 through welding, fastening means, etc., and is connected to the rear parts 180', 181' of the frame 102 through brackets and appropriate fastening means, as depicted.

Figure 21:
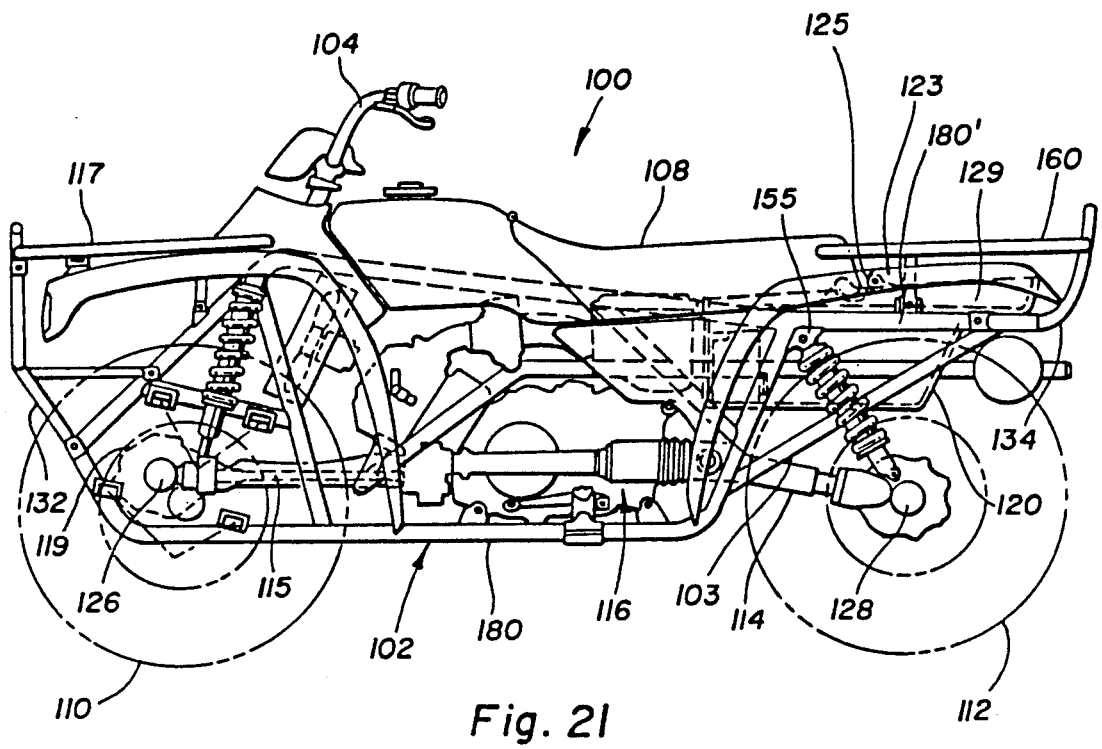
FIG. 21 is a side view of a saddle type, off-road vehicle according to a second embodiment of the present invention.
Figure 23:
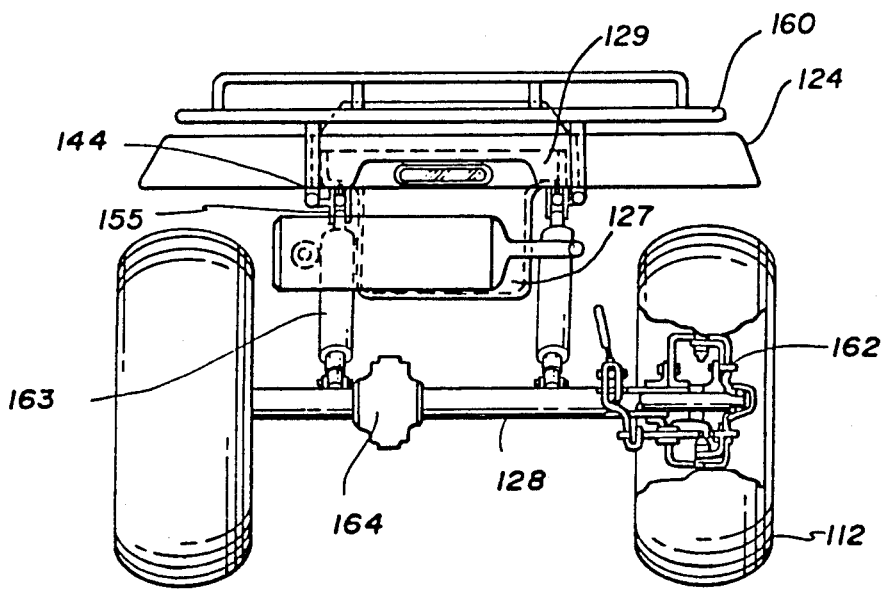
FIG. 23 is a rear view of the vehicle shown in FIG. 14.
Figure 22:
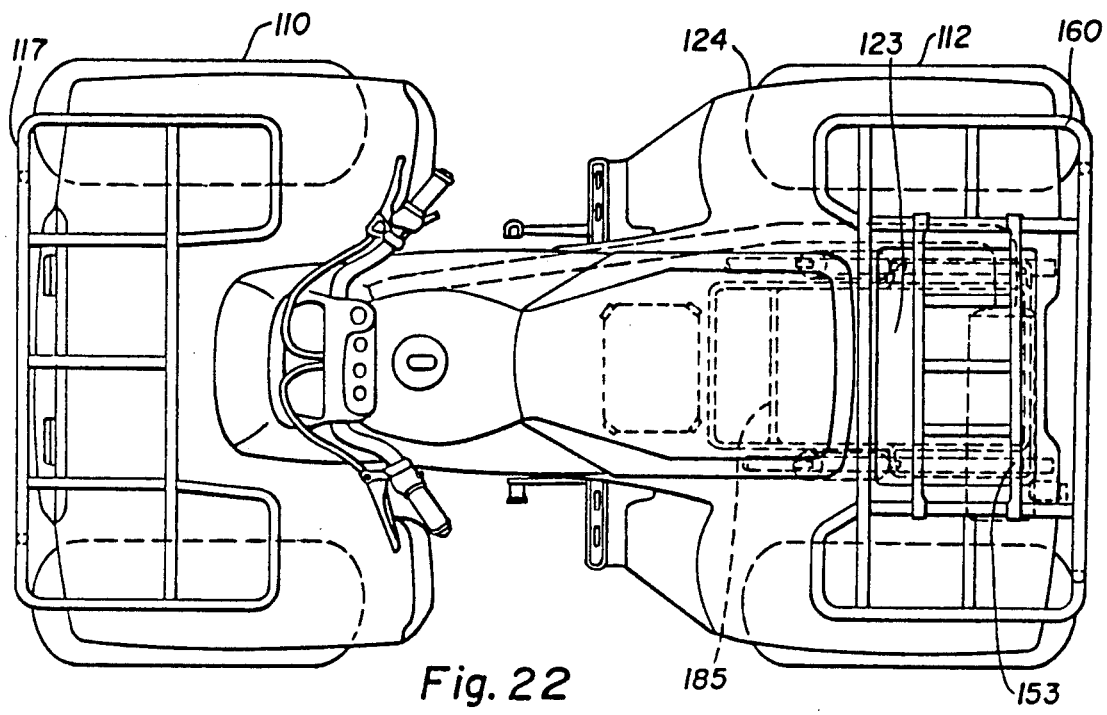
FIG. 22 is a plan view of the vehicle shown in FIG. 14.

As shown in FIGS. 21-23, the storage receptacle 120 according to the second embodiment of the invention extends from a rear end of the vehicle to a position beneath an intermediate portion of the rider's seat 108. The storage receptacle 120 preferably includes a main, lower section 127 which extends from a position above the rear axle 128 to a position beneath an intermediate portion of the rider's seat 108, and an upper section 129 which extends from a position near a rear end of the rear fender 124 to a position beneath a rear end of the rider's seat 108. A lid means 123 is preferably provided for closing an open upper rear end of the storage receptacle 120, while the rider's seat 108 covers the remaining, front open portion of the storage receptacle 120. The lid means 123 is pivotally hinged at a rear end thereof so that it can pivot open in a rearward direction, while a front end 125 of the lid means 123 cooperates with a lower rear portion of the rider's seat 108 to hold the lid in a securely closed position while the vehicle is traveling. The seat 108 will be pivotally mounted on the upper surface of the frame 102 in a known manner such that it can swing forwardly or sidewardly for permitting the lower rear end 109 thereof to cooperate with the front end 125 of the lid means 123. Relatedly, in reference to FIG. 22, the rear carrier or rack 160 includes a central section 153 which can pivot upwardly and laterally to one side of the rack 160 for providing easy access to the container 120 and to permit the lid means 123 to also pivot upwardly. A fastening means will be associated with the central section 153 for securing it in a lowered, operative position.

In a manner similar to the first embodiment, the storage receptacle 120 will be connected for support to the rear parts 180', 181' of the frame 102 through appropriate fastening means.

Particularly, as best shown in FIG. 23, the upper section 129 of the storage receptacle extends slightly laterally of the lower section such that there is a stepwise structure defined therebetween, while the rear parts 180', 181' of the frame 102 extend below the stepwise structure and are connected to the upper section 129 at connections 144. Further, a laterally extending cross member could be provided between the cross members 103 and/or rear ends of the major parts of the sections 180, 181 of the frame 102 so that a bottom wall of the storage receptacle 120 could be connected thereto for extra support. It will be understood that the receptacle 120 is substantially fitted to the rear frame 102.

The storage receptacle 120 will preferably be formed integrally with the rear fender 124 as a single unit. In slight contrast to the first embodiment, the battery 107 is disposed in a front portion of the storage receptacle 120 rather than in a separate, smaller receptacle. As depicted, a partition 185 may be provided in the lower section 121 of the storage receptacle 120 for separating the battery 107 from other objects placed in the receptacle.

A pair of rear cushioning units 163, which cushion vertical swinging movements of the rear axle 128, are provided on opposite sides of the storage receptacle 120. Lower ends of the units 163 are connected to the rear axle 128, while upper ends thereof are connected to brackets 191 provided on the frame 102. Further, a muffler 170 is disposed laterally behind the lower section 121 of the storage receptacle 120 where it does not interfere with the rear axle 128 or a differential 130 on the rear axle. Additionally, a braking mechanism 162 cooperating with the rear axle 128 is positioned near an outer end of the axle where it is disposed substantially within a rim of a rear wheel 112. The braking mechanism 162 is thus offset from the storage receptacle 120 and will not interfere therewith. It is contemplated that the muffler 170 could extend longitudinally of the vehicle 100, in which case it would be positioned between the receptacle 120 and one of the rear wheels 112.

As best understood from the comparison of FIGS. 3 and 23, the storage receptacle 120 has a smaller lateral width than that of receptacle 20, but receptacle 120 extends further downward toward the rear axle 128 than does the storage receptacle 20 in relation to rear axle 28. Preferably, a lower portion of the lower section 127 will be positioned laterally between the rear wheels 112. Through such construction, the storage receptacle 120 is substantially less noticeable than the storage receptacle 20. Although not shown, the rear differential 165 may be disposed on the rear axle 128 laterally outwardly of the lower portion 121 of the storage receptacle 120 so that it will not interfere with a lower surface of the storage receptacle when the rear axle 128 swings vertically upwardly. Furthermore, the bottom surface of the storage receptacle 120 could be inclined forwardly, downwardly to increase the storage area thereof, and to include one or more drain holes at the forward end thereof similar to the first embodiment.

Although there have been described what are at present considered to be the preferred embodiments of the invention, it will be understood that the invention can be embodied in other specific forms, and that many changes and modifications can be made to the above-described structures without departing from the spirit or essential characteristics thereof. The depicted embodiments are, therefore, to be considered in all aspects as merely illustrative, and not restrictive. The scope of the invention is indicated by the appended claims rather than the foregoing description.

We claim:

1. A saddle type, off-road vehicle, comprising:
    a frame;
    an engine supported on said frame;
    at least one front wheel;
    a pair of rear wheels disposed on opposite sides of said frame;
    a storage receptacle having at least a portion thereof positioned above said frame;
    a rider's seat disposed at least partially forwardly of said storage receptacle;
    said storage receptacle having an opening defined in an upper surface thereof, said opening having a larger width than a width of said seat; and
    a front portion of said opening being substantially U-shaped and being located at lateral sides of a rear part of said seat.

2. A vehicle according to claim 1, wherein:

the vehicle further includes lid means for selectively opening and closing said opening defined in the upper surface of the storage receptacle.

3. A vehicle according to claim 1, including:
lid means adapted to be simply fitted over the storage receptacle.

4. A vehicle according to claim 1, including:
a lid for covering said storage receptacle, the lid being pivotally connected to said storage receptacle at the U-shaped portion of said opening.

5. A saddle type, off-road vehicle comprising:
a frame;
an engine supported on said frame;
at least one front wheel;
a pair of rear wheels disposed on opposite sides of said frame;
a storage receptacle having at least a portion thereof positioned above said frame;
said storage receptacle having an opening defined in an upper surface thereof; and
lid means comprising a first lid adapted to be positioned over said opening defined in said storage receptacle, and a second smaller lid adapted to be positioned over an opening defined in said first lid for selectively opening and closing said opening defined in said first lid.

6. A vehicle according to claim 5, wherein:
said second lid is detachably mounted to the first lid such that it can be readily placed on and detached therefrom.

7. A saddle type, off-road vehicle, comprising:
a rigid frame;
an engine supported on said frame;
at least one front wheel;
a pair of rear wheels disposed on opposite sides of said frame;
a storage receptacle mounted to said frame and having at least a portion thereof positioned above said frame;
said storage receptacle having an opening defined in an upper surface thereof;
lid means for selectively covering said opening defined in said upper surface of said storage receptacle;
a front portion of said lid means being positioned at a level above said seat and forwardly inclined toward said seat;
a pair of foot supports disposed on opposite sides of said frame;
said front portion of the lid means extend upwardly from the seat; and
a surface of the front inclined portion of said lid means being positioned rearwardly of a line extended between one of said foot supports and an upper rear part of said seat.

8. A vehicle according to claim 3, wherein:
a lower peripheral portion of the lid means is adapted to extend outwardly of an upper peripheral portion of the storage receptacle when the lid means is fitted over the storage receptacle.

9. A vehicle according to claim 3, wherein:
a lower peripheral portion of the lid means is adapted to extend outwardly and downwardly of an upper peripheral portion of the storage receptacle when the lid means is fitted over the storage receptacle.

10. A vehicle according to claim 7, wherein said lid means is adapted to be securely fitted over the storage receptacle without attachment thereto.

11. A vehicle according to claim 10, wherein said lid means includes lower, peripheral lip means for securely engaging the storage receptacle without attachment thereto.

12. A saddle type, off-road vehicle, comprising:
a frame;
an engine supported on said frame;
at least one front wheel;
a pair of rear wheels disposed on opposite sides of said frame;
a storage receptacle having at least a portion thereof positioned above said frame;
said storage receptacle having an opening defined in an upper surface thereof;
lid means adapted to be simply fitted over said storage receptacle;
the upper surface of said storage receptacle having at least one recess defined therein;
a lower surface of said lid means having at least one downwardly projecting member provided thereon; and
said downwardly projecting member being adapted to be fitted in said recess defined in said upper surface of said storage receptacle.

13. A saddle type, off-road vehicle, comprising:
a rigid frame;
an engine mounted to said frame;
at least one front wheel;
a pair of rear wheels disposed on opposite sides of said frame;
a storage receptacle supported by said frame;
a rider's seat disposed at least partially forwardly of said storage receptacle;
said storage receptacle having an opening defined in an upper surface thereof, said opening having a larger width than a width of said seat;
a front portion of said opening being substantially U-shaped and being located at lateral sides of a rear part of said seat; and
a load securing means provided near said storage receptacle.

14. A vehicle according to claim 13, wherein:
said load securing means is provided within the storage receptacle.

15. A vehicle according to claim 13, wherein:
said load securing means is connected to the frame.

16. A saddle type, off-road vehicle according to claim 7, including:
load securing means provided between said seat and said storage receptacle; and
said load securing means is connected to a bottom plate of said seat.

17. A vehicle according to claim 16, wherein said load securing means is adapted to secure loads disposed within said storage receptacle.

18. A vehicle according to claim 13, wherein:
at least a portion of said storage receptacle is positioned rearwardly of said seat.

19. A saddle type, off-road vehicle, comprising:
a rigid frame;
an engine mounted to said frame;
a pair of rear wheels disposed on opposite sides of said frame;
at least one front wheel;
a storage receptacle supported by said frame;
a rider's seat disposed at least partially forwardly of said storage receptacle;

said storage receptacle having an opening defined in an upper surface thereof, said opening having a larger width than a width of said seat;

a front portion of said opening being substantially U-shaped and being located at lateral sides of a rear part of said seat; and said storage receptacle having rigidity compensation means provided for reinforcing the upper surface thereof.

20. A vehicle according to claim 19, including:
a rear fender;
and wherein said storage receptacle and said rear fender are formed as an integral unit; and
said rigidity compensation means comprises an upper portion of the rear fender which extends integrally outwardly and downwardly of the upper surface of the storage receptacle.

21. A vehicle according to claim 19, wherein:
said rigidity compensation means comprises at least one rib provided on an upper portion of said storage receptacle.

22. A vehicle according to claim 19, wherein:
said rigidity compensation means comprises an upper portion of the storage receptacle, said upper portion having an increased wall thickness.

23. A vehicle according to claim 19, including:
lid means for selectively opening and closing said opening defined in said upper surface of said storage receptacle.

* * * * *

UNITED STATES PATENT AND TRADEMARK OFFICE
CERTIFICATE OF CORRECTION

PATENT NO. : 5,060,748

DATED : October 29, 1991

INVENTOR(S) : Iwai et al.

It is certified that error appears in the above-identified patent and that said Letters Patent is hereby corrected as shown below:

Column 3, line 51, change "end-of" to —end of—.

Column 10, line 30, change "165" to —164—.

Signed and Sealed this

Ninth Day of March, 1993

*Attest:*

STEPHEN G. KUNIN

*Attesting Officer*      Acting Commissioner of Patents and Trademarks